Patented Aug. 7, 1951

2,563,375

UNITED STATES PATENT OFFICE 2,563,375

5-AMINOISOPHTHALOYLACETONITRILE

Leslie M. Schenck, Westfield, N. J., assignor to General Aniline & Film Corporation, New York, N. Y., a corporation of Delaware No Drawing. Application October 29, 1949, Serial No. 124,518

3 Claims. (Cl. 260—465)

This invention relates to a new composition of matter and to a method for preparing it. p-Aminobenzoylacetonitrile is known and has been prepared by a Friedel-Crafts reaction which gives a poor yield. The present invention is directed to the production of 5-aminoisophthaloylacetonitrile and for a method of producing it.

It has been found that reacting 5-carbethoxyaminoisophthaloylchloride with ethylcyanoacetate and an enolizing agent and hydrolyzing the product, 5-aminoisophthaloylacetonitrile is obtained.

The following example illustrates a preferred embodiment of the invention but variations and substitutions may be made within the scope of the appended claims.

Example 100 parts of 5-carbethoxyaminoisophthalic acid is added to a solution of 220 parts of benzene and 230 parts thionylchloride. The mixture is refluxed until the evolution of hydrogen chloride ceases and the volatile solvent is then removed in vacuum, the residual acid chloride is dissolved in 260 parts acetone and added during one hour at a temperature below 5° C. to a mixture 460 parts acetone, 175 parts ethylcyanoacetate and 81 parts 95% sodium methylate. After stirring several hours below 5° C., the solution is drowned in water and the product precipitated by the addition of acetic acid. The crude material is hydrolyzed by refluxing for ½ hour with a slight excess of sodium hydroxide solution. Upon cooling the product is precipitated by slowly adding acetic acid. The product is a white crystalline material having a melting point of 211–212° C.

In the above example, the acid chloride may be precipitated with petroleum ether instead of removing the volatile solvents. Furthermore, it is not necessary to dissolve the acid chloride in acetone and add slowly to the other reactants since it is possible to mix them together. The hydrolysis step may be accomplished at a temperature lower than the reflux temperature. Alkaline reactants other than sodium hydroxide may be used for the hydrolysis. Other inert solvents may be substituted as may other enolizing agents such as other sodium alcoholates as will be apparent to those skilled in the art.

The reaction may be represented as follows:

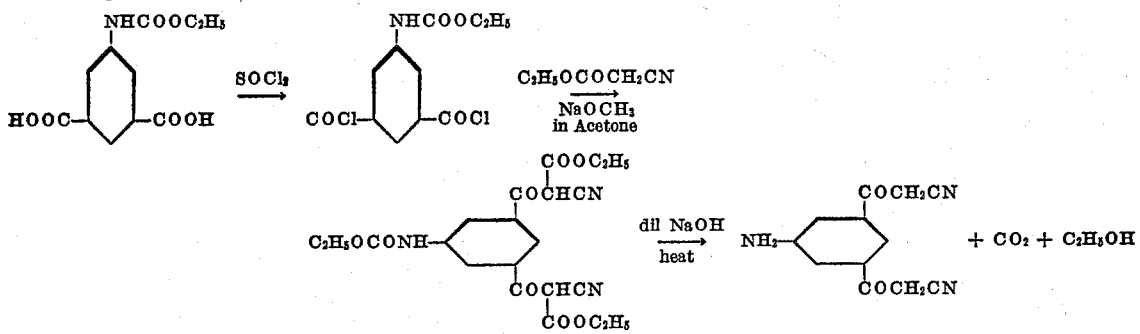

The product is useful in preparing magenta color formers for color film.

I claim:

1. 5-aminoisophthaloylacetonitrile.
2. A process for producing 5-aminoisophthaloylacetonitrile which comprises reacting 5-carbethoxyaminoisophthaloylchloride with ethylcyanoacetate and an enolizing agent and hydrolyzing the product.
3. A process for producing 5-aminoisophthaloylacetonitrile which comprises reacting 5-carbethoxyaminoisophthalic acid with thionyl chloride, reacting the chloride thus formed with ethylcyanoacetate in the presence of sodium methylate and hydrolyzing the product in an alkaline medium.

LESLIE M. SCHENCK.

REFERENCES CITED

The following references are of record in the file of this patent:

UNITED STATES PATENTS

| Number | Name | Date |
| --- | --- | --- |
| 1,950,421 | Wahl | Mar. 13, 1934 |
| 2,392,167 | Long et al. | Jan. 1, 1946 |

OTHER REFERENCES

Dorsch et al., J. Am. Chem. Soc., vol. 54, pp. 2960–2964 (1932).

Long et al., J. Am. Chem. Soc., vol. 69, pp. 990–995 (1947).